Figure 1:
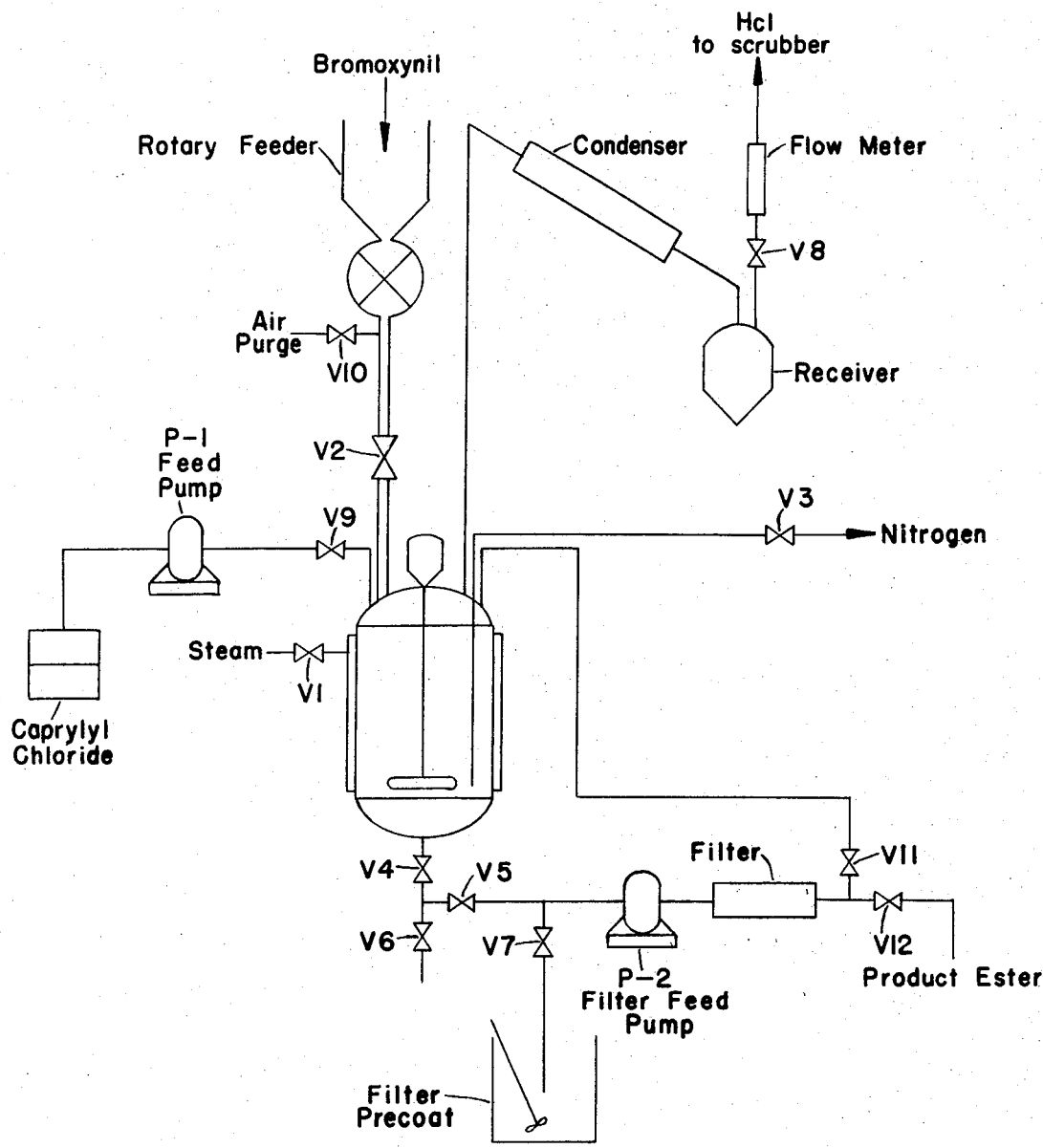

United States Patent
Goldstick

[15] 3,671,556
[45] June 20, 1972

[54] MANUFACTURING PROCESS FOR ESTERS OF DIHALO-HYDROXYBENZONITRILES

[72] Inventor: Robert Jay Goldstick, Philadelphia, Pa.
[73] Assignee: Amchem Products, Inc., Ambler, Pa.
[22] Filed: Nov. 21, 1969
[21] Appl. No.: 878,724

[52] U.S. Cl. ..........................260/404, 11/105, 260/456 R, 260/465 D
[51] Int. Cl. ..........................C09f 7/00, C09f 7/10
[58] Field of Search ..................260/404, 479, 479 S, 465 D

[56] References Cited

UNITED STATES PATENTS

| 1,031,971 | 7/1912 | Sulzberger | 260/479 |
| 2,508,334 | 5/1950 | Moyle | 260/479 |
| 2,073,316 | 3/1937 | Nierderl | 260/479 |
| 3,278,569 | 10/1966 | Simon et al. | 260/410.5 |

FOREIGN PATENTS OR APPLICATIONS

| 1,067,033 | 4/1967 | Great Britain | 260/465 D |

Primary Examiner—Lewis Gotts
Assistant Examiner—G. Hollrah
Attorney—Ernest G. Szoke

[57] ABSTRACT

Aliphatic, cycloaliphatic or aromatic esters of 3,5-dihalo-4-hydroxybenzonitrile are prepared by gradually adding the solid benzonitrile derivative to a slight molar excess of the corresponding acid chloride kept at temperatures above 120° C and venting the liberated hydrogen chloride through an alkaline scrubber.

4 Claims, 1 Drawing Figure

MANUFACTURING PROCESS FOR ESTERS OF DIHALO-HYDROXYBENZONITRILES

This invention concerns the preparation of esters of 3,5-dihalo-4-hydroxybenzonitrile by a direct method. The dichloro-, dibromo- and diiodohydroxybenzonitriles, also known as chloroxynil, bromoxynil and ioxynil, have obtained in the form of certain esters extensive use as herbicides in the control of broad-leafed weeds, particularly in crop growing areas. Examples of such esters are those formed from the 3,5-dichloro-, dibromo-, or diiodo-4-hydroxy-benzonitrile and unsubstituted or halogenated aliphatic or aromatic acids, such as trichloroacetyl, propanoic, α, α-dichloropropionic, n-butanoic, n-octanoic, 2-ethylhexanoic, cyclohexylcarboxylic, benzoic and benzenesulfonic acids.

As herbicides, these benzonitrile derivatives have great economic value as they are particularly effective and specific when applied to areas growing such crops as cereals, grasses, sugar cane, legumes, flax, linseed, carrots, onions and cabbage. These benzonitrile derivatives completely control the undesired vegetation at relatively low application rates without harming the crops and thus allow the crops to take full advantage of the nutrients and space available.

The benzonitrile derivatives can also be used for weed control in orchards, plantations and vineyards provided they are applied directly to the weeds by directional spraying.

Hitherto, the synthesis of these valuable herbicides has been accomplished by two methods. According to one, the 3,5-halo-4-hydroxybenzontrile is reacted with an organic anhydride in the presence of a condensing agent, such as concentrated sulfuric acid or a sodium or potassium salt of the corresponding organic acid. According to the other method, the benzonitrile derivative is reacted with an acid halide, e.g. the chloride, in the presence of a tertiary base, e.g. pyridine, or in the presence of a quarternary ammonium salt, e.g. tetraalkylammonium chloride.

Both of these methods have disadvantages and shortcomings.

In the anhydride method only one half of the acid equivalent of the anhydride is reacted with the hydroxybenzonitrile, the other half is converted into free acid which must be removed from the reaction mixture and is essentially a waste product. Also, the removal of the condensing agent, sulfuric acid or alkali salt of the organic acid, needs additional processing and causes extra expense when the ester of the benzonitrile derivative is needed in a purified form.

The use of tertiary bases, such as pyridine, usually in excess, in the second method mentioned is expensive and complicates the synthesis process for the following reason. Most of the base has to be recovered for reuse, necessitating an appropriate separation step and equipment, such as distillation. The portion of the base which served as acceptor for the hydrogen chloride formed requires other processing steps as it has to be separated from the ester product.

The variant of the acid chloride method carried out in the presence of quaternary salts has the disadvantage of employing these rather costly salts. Their direct recovery for reuse is expensive, if not impossible, and even the separation of these salts from the product ester involves such steps as addition of solvent, neutralization and crystallization.

Notwithstanding these disadvantages, recent technical and patent literature, as exemplified by Canadian Pat. No. 801,071 of B. J. Heywood and W. G. Leeds, issued Dec. 10, 1968, still refer to, and describe, the mentioned synthesis techniques as the methods of choice.

I have now discovered that the desired, useful and valuable esters of 3,5-dihalo-4-hydroxybenzonitriles having potent herbicidal properties can be readily obtained in good yields and purity by direct reaction of the hydroxybenzonitrile derivatives with the appropriate acid halides, if the dry solid hydroxybenzonitrile is gradually added to the liquid acid halide kept at a temperature above 120° C.

Accordingly, the objective of my invention is the provision of a simplified process for the preparation of esters of 3,5-dihalo-4-hydroxybenzonitrile. It is a further objective of my invention to accomplish this synthesis without consuming hard to recover solvents, acid acceptors or condensing agents. A still further objective of my invention is a process for the synthesis of herbicidal esters of the mentioned benzonitrile derivatives in which the product is obtained directly in satisfactory degree of purity and yield, without being contaminated by, or admixed with, difficulty removable byproducts, inorganic or organic salts, condensing agent or catalysts. It is a particular objective of my invention to provide a simplified, effective and inexpensive method for the preparation of the caprylic and 2-ethylhexanoic esters of 3,5-dibromo-4-hydroxybenzonitrile. Still another specific objective of my invention is the provision of suitable process equipment for the mentioned synthesis.

My invention is based on the observation that 3,5-dihalo-4-hydroxybenzonitrile when gradually added to a slight excess of an acid halide, e.g. caprylyl chloride, kept above about 120° C will react essentially quantitatively to form the ester under evolution of HCl according to the equation

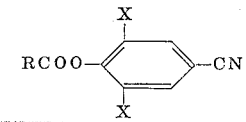

where X is a halogen and R an organic group containing three or more carbon atoms. According to this invention the ester product is prepared in high purity and substantially quantitative yield. The reaction does not need any base, acid acceptor, catalyst or condensing agent if carried out according to my invention. Generally, a solvent is also unnecessary to facilitate or complete the reaction.

The term halogen as used herein denotes all four halogens, namely chloro, bromo, iodo and fluoro with bromo and iodo being preferred.

The organic groups designated by the symbol R is intended to include all of the usual organic acid moieties either aliphatic or aromatic and which are available as the corresponding acid chloride. The preferred organic acid chlorides are the aliphatic particularly the alkanoic acids, both straight and branched chain, having from 3 to 18 carbon atoms and preferably from eight to 12 carbon atoms. Substituted aliphatic acid groups wherein one or more of the hydrogen atoms has been replaced by a functional group such as halo, nitro, amino, etc. are also included. Suitable aromatic acids are the aralkanoic acids such as benzoic acid and the same where the aromatic moiety is substituted with functional groups such as lower alkyl, halo, sulfonyl, trifluoromethyl, nitro, amino and the like.

The preferred acid chlorides used in the process of this invention are those having a boiling point above about 120° C though lower boiling acid chlorides can be used in which case the reaction is suitably carried out at an elevated pressure sufficient to attain a reaction temperature of about 120° C or higher while maintaining the acid chloride in the liquid phase.

The release of gaseous HCl which is vented through an alkaline scrubber drives the reaction to completion. As only a slight excess of the acid chloride is used and no residual byproducts are formed, the desired ester of the dihalobenzonitrile derivative is obtained in a substantially pure state admixed with a small amount of unreacted acid chloride used in excess which usually can be readily removed by distillation, suitably high vacuum distillation or nitrogen stripping, and reused.

The successful performance of the ester synthesis according to my invention depends on the even and steady release of gaseous hydrogen chloride without excessive foaming while maintaining sufficiently high reaction rate. I have found that this can be accomplished by using about 1.1 to about 1.5 moles of acid chloride per mole of hydroxybenzonitrile and by charging all of the acid chloride needed for the reaction into a reaction vessel, maintaining the reaction temperature above about 120° C and by gradually adding the benzonitrile reactant. The gradual addition of the benzonitrile is preferably done continuously and at a rate such that about one-fourth to one-third of the benzonitrile derivative is added during the first hour and the rest during the next one to three hours.

Occasionally defoaming agents may be used but generally none are needed. In case the acid chloride is unusually viscous or high-melting, a solvent can be used which is selected so as to be readily recoverable and separable from the excess acid chloride.

In large scale preparations, the addition of solid dihalo-hydroxy-benzonitrile, stored in a feed bin or hopper, is conveniently carried out and controlled by means of a rotary feeder operated by a star valve, screw conveyor or similar solids feeder device.

The yield of the ester is essentially the theoretical value corresponding to the benzonitrile derivative used. Apart from the impurities present in the starting materials, the product contains little or no other impurities or byproducts, except of course the excess acid halide. Where further purification of the ester product is desired it can be conveniently accomplished by methanol extraction.

The process of my invention is applicable to the preparation of the esters of the mentioned 3,5-dichloro-, -dibromo-, and -diiodo-4-hydroxybenzonitriles and to analogous dihalo compounds in which the two halogen substituents are not the same. The process is eminently applicable to the preparation of the most desired aliphatic esters containing three to 12, and preferably six to 10, carbon atoms in the acid group, but is also suitable for the preparation of the esters of the mentioned benzonitrile derivatives containing halogen substituted aliphatic acid groups or various substituted or unsubstituted cycloaliphatic or aromatic acid groups. The combination of the various acid moieties with the various dihalo-hydroxybenzonitrile moieties further enhances the variety of esters, the preparation of which is encompassed by my invention.

In the following I will describe the execution of my invention by means of several specific examples performed under the optimum conditions known to me. These examples are not to be construed as limiting the scope of my invention which is defined only by my claims.

EXAMPLE 1

One hundred forty three grams of caprylyl chloride (0.88 moles) and 30 grams of 3,5-dibromo-4-hydroxybenzonitrile (bromoxynil) were charged to a 500 ml reaction flask with stirring and heated to 120° C. The HCl evolved during the reaction was allowed to escape through a caustic scrubber in which it was neutralized. When the reaction was complete as shown by the amount of HCl evolved, an additional 30 g of bromoxynil was charged to the reaction flask, whereupon the reaction continued to proceed. When this reaction went to completion, another quantity of bromoxynil was charged. This procedure was repeated three more times so that there were a total of six charges representing a total of 0.618 moles of bromoxynil.

On completion of the reaction of the last charge, the product in the reaction vessel was placed in a vacuum distillation apparatus and the pressure was reduced to 15 mm Hg absolute. No appreciable amount of distillate was collected up to a pot temperature of 120° C. To remove the excess caprylyl chloride, nitrogen was bubbled through the reaction product for several hours while the temperature was kept at 120° C.

The residual crude ester weighed 251.3 grams. As it had a saponification number corresponding to the theoretical value, and a refractive index (1.5270 at 50° C) corresponding to the value for the purified ester (1.5330 at 50° C) this weight corresponds essentially to 100 percent yield of theory (theoretical yield 249.7 g from 0.618 moles).

The ester was then dissolved in isopropanol and reprecipitated by the gradual addition of water. Four fractions of varying purity were collected. All had refractive indices between 1.5305 and 1.5322 at 50° C. The yield of the crystallized material was 86.9 percent based on the crude ester.

EXAMPLE 2

Example 1 was repeated, except that 2-ethylhexanoyl chloride was used instead of caprylyl chloride. The reaction proceeded in the same manner as in Example 1. The yield and purity of the product, in this case the 2-ethylhexanoate ester, was similar to the values obtained in Example 1.

EXAMPLE 3

Using a 1,000-gallon glass-lined kettle and the auxiliary equipment shown in FIG. 1 as the reactor system, 2,450 lbs. of caprylyl chloride was charged into the kettle through valve V9 with the valve V8 on the vent line open. The charge was then heated to 250° F (121° C) under stirring. On reaching this temperature, butterfly valve V2 was opened and a small air purge was started through valve V10 to prevent escape of HCl. The rotary star feeder was then started to feed 3,000 lbs. of solid bromoxynil (95 percent by weight purity, 5 percent undetermined inorganic impurities) from the feed bin. The temperature was maintained at 245°–255° F during the reaction, and the pressure was kept at 20 psig by adjusting valve V8. The HCl flow was measured on the flowmeter. When all the bromoxynil had been added, valves V2 and V10 were closed. Towards the end of the reaction, valve V8 was opened wide, whereupon the pressure in the kettle reduced to atmospheric. When the flow of HCl stopped, the system was purged by nitrogen through valve V3.

From time to time sampled were taken through valves V4 and V6 with V3 closed. After 15 hours of purging at 250° F, the caprylyl chloride content of the reaction product dropped to 1.5 weight %. At this point the $N_2$ flow was closed off and the reaction product ester was diluted with 50 gallons of Solvesso (xylene oil commercially available from Humble Oil and Refining Co.) introduced from a tank through valve V7 and then filtered through a plate and frame filter press. Analysis of the product ester solution indicated that 4,100 lbs. of the caprylate ester of bromoxynil formed, corresponding to a molar yield of 100 percent based on the bromoxynil.

Having described my invention and its various embodiments in several examples, I claim:

1. A process for the preparation of a compound of the formula

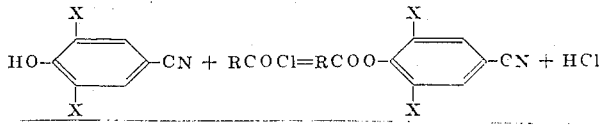

wherein X represents a halo group and R represents the organic moiety of an alkanoic acid either straight or branched-chain having from three to 18 carbon atoms and such alkanoic acids substituted by one of more functional groups selected from the group consisting of halo, nitro and amino or benzoic acid or a benzoic acid where the aromatic moiety is substituted by lower alkyl, halo, trifluoromethyl, nitro or amino which comprises gradually adding solid 3,5-dihalo-4-hydroxybenzonitrile to a liquid acid chloride of the formula RCOCl wherein R has the same meaning as above maintained at a temperature above about 120° C. and continuously removing gaseous HCl formed in the reaction such that the amount of acid chloride employed in the process is about 1.1 to 1.5 moles per mole of 3,5-dihalo-4-hydroxybenzonitrile.

2. The process according to claim 1 wherein the acid chloride reactant is an aliphatic acid chloride having eight to 12 carbon atoms.

3. The process according to claim 2 wherein the dihalo-4-hydroxybenzonitrile reactant is added at a rate such that the entire addition is completed in about 2 hours and about one-third of the reactant is added during the first hour.

4. A process for the preparation of 3,5-dibromo-4-hydroxybenzonitrile octanoate which comprises adding solid 3,5-dibromo-4-hydroxy-benzonitrile to about 1.1 to 1.5 moles of octanoic acid per mole of 3.5-dibromo-4-hydroxybenzonitrile at a rate such that one-third of the 3,5-dibromo-4-hydroxybenzonitrile is added during the first hour and the remainder during the second hour while maintaining the reaction temperature above about 120° C and continuously removing gaseous HCl formed in the reaction.

* * * * *